US006681467B2

(12) United States Patent
Fuchs et al.

(10) Patent No.: US 6,681,467 B2
(45) Date of Patent: Jan. 27, 2004

(54) APPARATUS AND METHOD FOR SIMPLE REPLACEMENT OF COMPONENT PARTS IN A WEB-PROCESSING MACHINE

(75) Inventors: Werner Fuchs, Woerthsee (DE); Stefan Brecht, Munich (DE)

(73) Assignee: Océ Printing Systems GmbH, Poing (DE)

( * ) Notice: Subject to any disclaimer, the term of this patent is extended or adjusted under 35 U.S.C. 154(b) by 70 days.

(21) Appl. No.: 10/090,996

(22) Filed: Mar. 5, 2002

(65) Prior Publication Data

US 2002/0148926 A1 Oct. 17, 2002

(30) Foreign Application Priority Data

Mar. 7, 2001 (DE) ........................................ 101 10 928

(51) Int. Cl.[7] ................................................ B23P 19/04

(52) U.S. Cl. .................. 29/402.08; 29/426.1; 162/273; 162/274; 26/3; 26/106

(58) Field of Search .......................... 29/402.08, 895.1, 29/426.1, 426.5; 226/91, 190, 194; 162/272, 273, 274; 26/3, 106

(56) References Cited

U.S. PATENT DOCUMENTS 1,740,776 A * 12/1929 Murai et al. .................... 26/3
3,008,621 A 11/1961 Mason
3,825,724 A * 7/1974 Kingsley et al. ............ 219/469
4,232,435 A * 11/1980 Eriksen ........................ 26/106
4,504,359 A * 3/1985 Eriksen ...................... 162/274
4,905,355 A * 3/1990 Bauer et al. .................. 28/187
6,246,856 B1 6/2001 Kopp et al.

FOREIGN PATENT DOCUMENTS

WO WO 98/39691 9/1998

* cited by examiner

*Primary Examiner*—David P. Bryant
(74) *Attorney, Agent, or Firm*—Schiff Hardin & Waite

(57) ABSTRACT

In processing web material, the material is passed through a guiding arrangement which has a plurality of guide elements. In order to enable removing the guide element for repair without disturbing the web material, each of the guide elements is provided with a lifting arrangement which is concentric to the guide element and is movable from one angular position withdrawn from the path of the elongated material engaging the guide element to a second position lifting the elongated material off of the guide element so that the guide element can be axially withdrawn from the machine.

20 Claims, 8 Drawing Sheets

APPARATUS AND METHOD FOR SIMPLE REPLACEMENT OF COMPONENT PARTS IN A WEB-PROCESSING MACHINE

BACKGROUND OF THE INVENTION

The present invention is directed to an apparatus for guidance of an elongated material, particularly of a web-like material, and of a traction mechanism in the web-processing machine. The invention is also directed to a system for printing or copying and to a method for the guidance of an elongated material.

Examples of web-processing machines are printers or copies wherein web-shaped recording media are guided via guide elements, for example drums or rolls. In order to thread web material through the machine at the beginning of a processing event, traction mechanisms in the form of traction cables or bands are often employed. These cables or bands grasp a leading section of the web material and guide it largely automatically through the machine. The traction mechanisms are also conducted via guide elements. Examples of these printers and copiers are disclosed by WO 98/39691, whose disclosure is incorporated herein by reference thereto.

In known printers and copiers, the guide elements for the web material or the traction mechanisms as well as their bearings are generally parts that must be maintained or replaced at specific time intervals. A relatively high assembly outlay is required for replacing these component parts. In addition, the web material and/or traction mechanism must usually be removed.

SUMMARY OF THE INVENTION

An object of the present invention is to offer an apparatus and a method that allows assembly work at the guide elements for the elongated material to be implemented in a simple way.

This object is achieved by an apparatus for guidance of an elongated material in which a pivotable or shiftable lifting mechanism or element is provided for each guide element for guiding the elongated material, said lifting element being pivotable from a first position at the guide element outside of the region wherein the elongated material runs via the guide elements into a second position where it holds the elongated material at a distance from the guide elements.

According to the invention, the pivotable lifting mechanism is allocated to each guide element for guiding the elongated material, for example a material web or a traction mechanism. This lifting mechanism has two positions. In the first position, the lifting mechanism is outside of the region wherein the elongated material runs via the guide element and is, thus, in a retracted position. In the second position, the lifting mechanism holds the elongated material at a distance from the guide element. In this way, assembly work can be implemented at the guide element without having to remove the elongated material from the machine. This arrangement facilitates the assembly job.

According to another aspect, a system for printing or copying is provided which is equipped with the apparatus of the present invention, and this system for printing or copying can be easily maintained and requires very little assembly outlay.

Other advantages and features of the invention will be readily apparent from the following description of the preferred embodiments, the drawings and claims.

DESCRIPTION OF THE PREFERRED EMBODIMENTS

Figure 1:
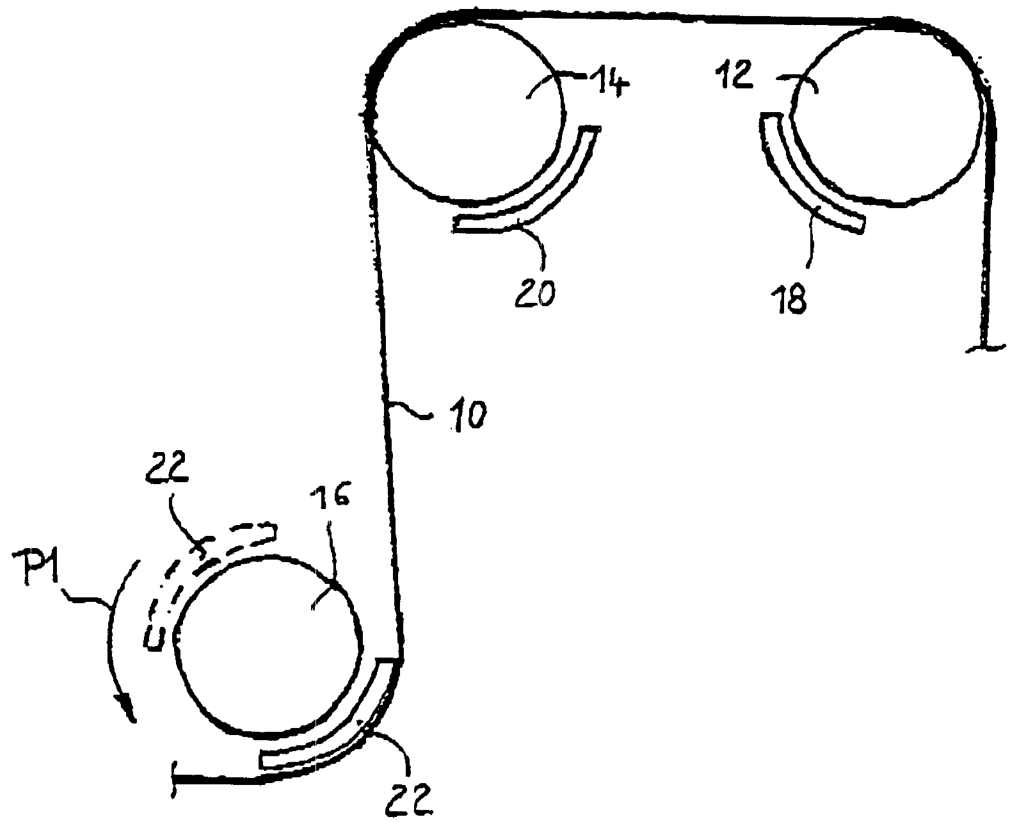
FIG. 1 is a schematic illustration illustrating the principles of the present invention.

The principles of the present invention are schematically shown in FIG. 1, wherein a traction mechanism in the form of a traction cable 10 is conducted around a plurality of deflection rollers 12, 14 and 16 that are generally referred to as guide elements. In the example of this Figure, a respective deflection of the traction cable 10 by 90° occurs at each of the rollers 12, 14 and 16. Each deflection roller has a lifting mechanism 18, 20 and 22. By pivoting the lifting mechanisms 18, 20 and 22 through 180° concentric to the central axis of the respective deflection rollers 12, 14 and 16, the traction cable 10 can be lifted off of the respective deflection roller 12, 14 and 16 or lowered thereon.

As illustrated, the lifting mechanisms 18 and 20 are shown in the respective first or retracted position, wherein the traction cable 10 proceeds unimpeded over the respective guide rollers 12 and 14. However, the lifting element 22, as shown in solid lines, is in the second or actuating position, wherein it holds the traction cable 10 at a distance from the deflection roller 16. In this condition, the deflection roller 16 can be removed from the machine or replaced without having to remove the traction cable 10. On the contrary, this traction cable 10 remains in a guided and potentially tensed condition as a result of being lifted off of the roller 16 by the lifting mechanism 22. The first or retracted position of the lifting mechanism 22 for the roller 16 is shown by broken lines. It is, thus, pivoted by 180° in the direction of the arrow P1 relative to the second position. This first position is the normal operating position, wherein the traction cable 10 lies on the deflection roller 16. The second position, wherein the traction cable 10 is lifted off from the deflection roller 16, is then reached by pivoting by 180° in the direction of the arrow P1.

Figure 2:
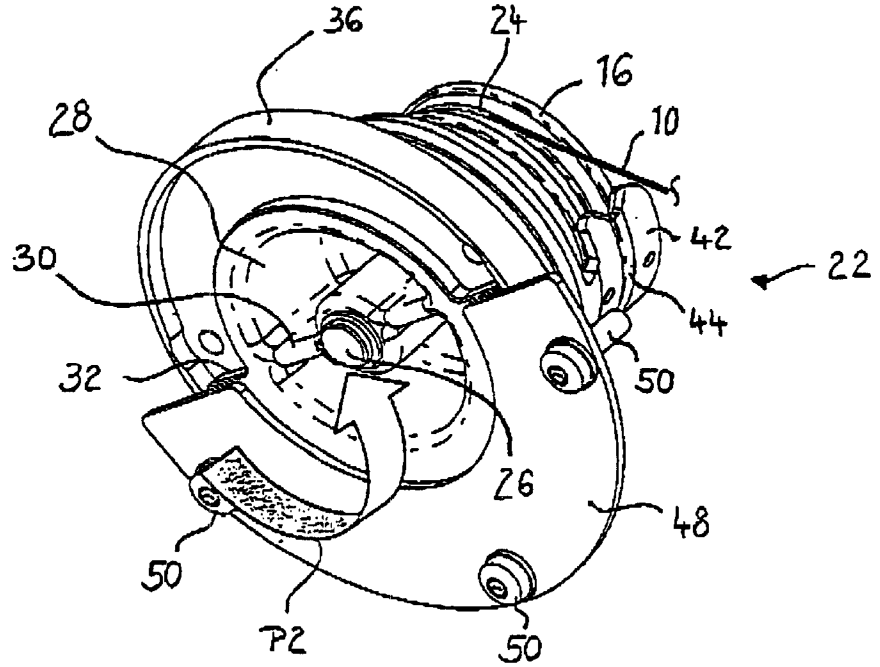
FIG. 2 is a perspective end view of an exemplary embodiment having a deflection roller and a lifting mechanism in a locked or retracted position.
Figure 3:
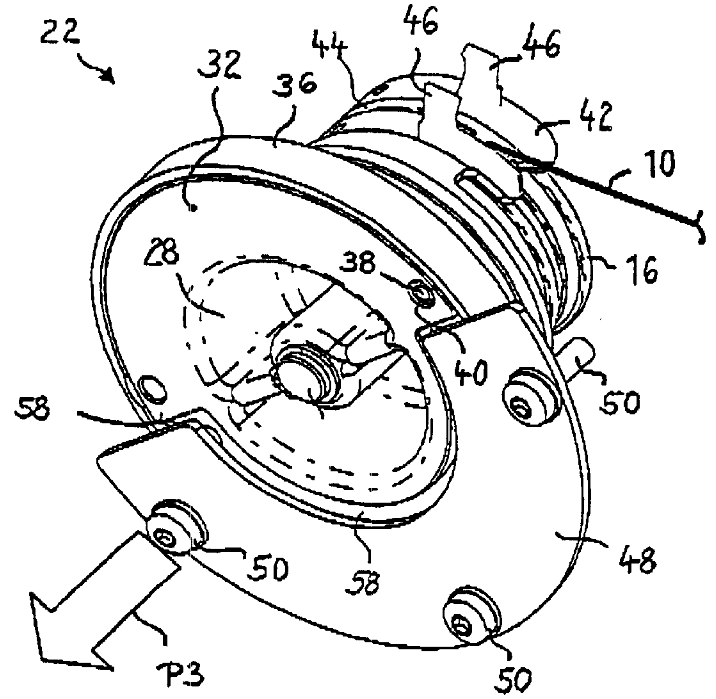
FIG. 3 is a perspective illustration of the device of FIG. 2 with the lifting mechanism in the axially unlocked position.
Figure 4:
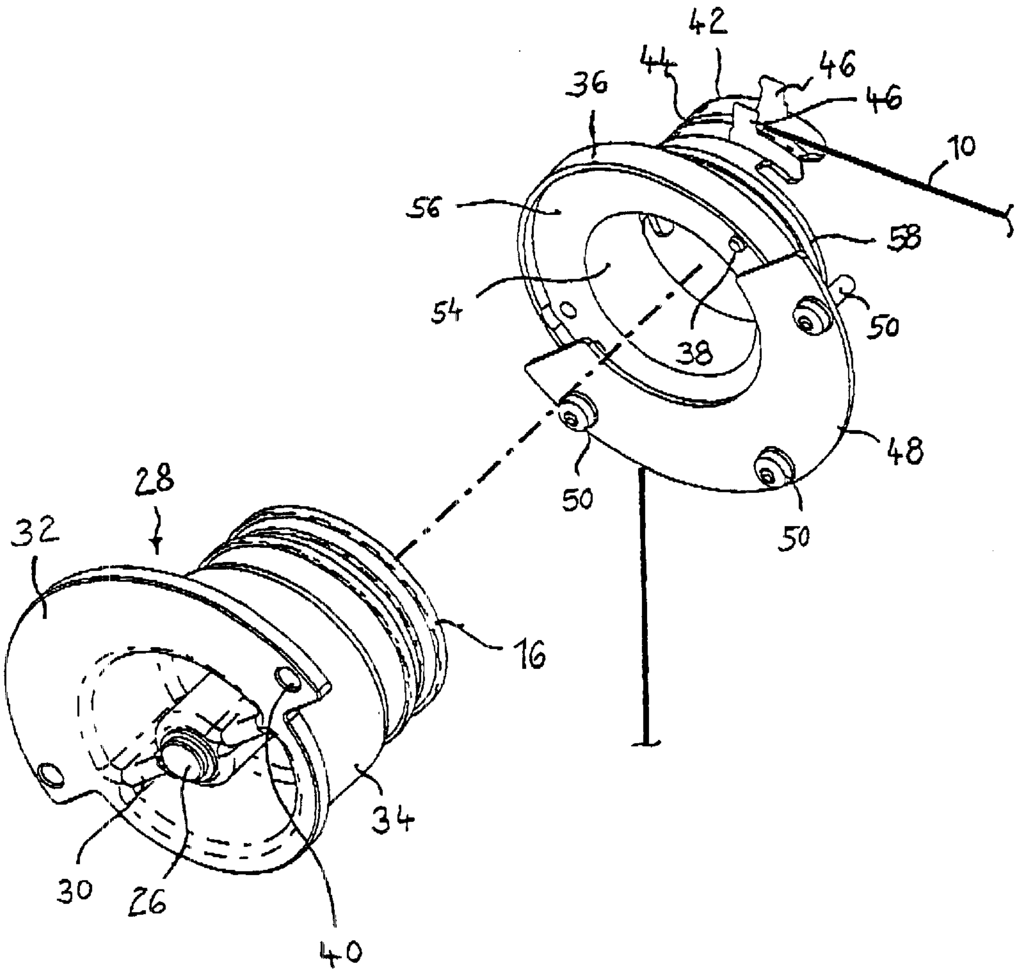
FIG. 4 is an exploded perspective view of an insert with the deflection roller being removed from the rotary flange.
Figure 5:
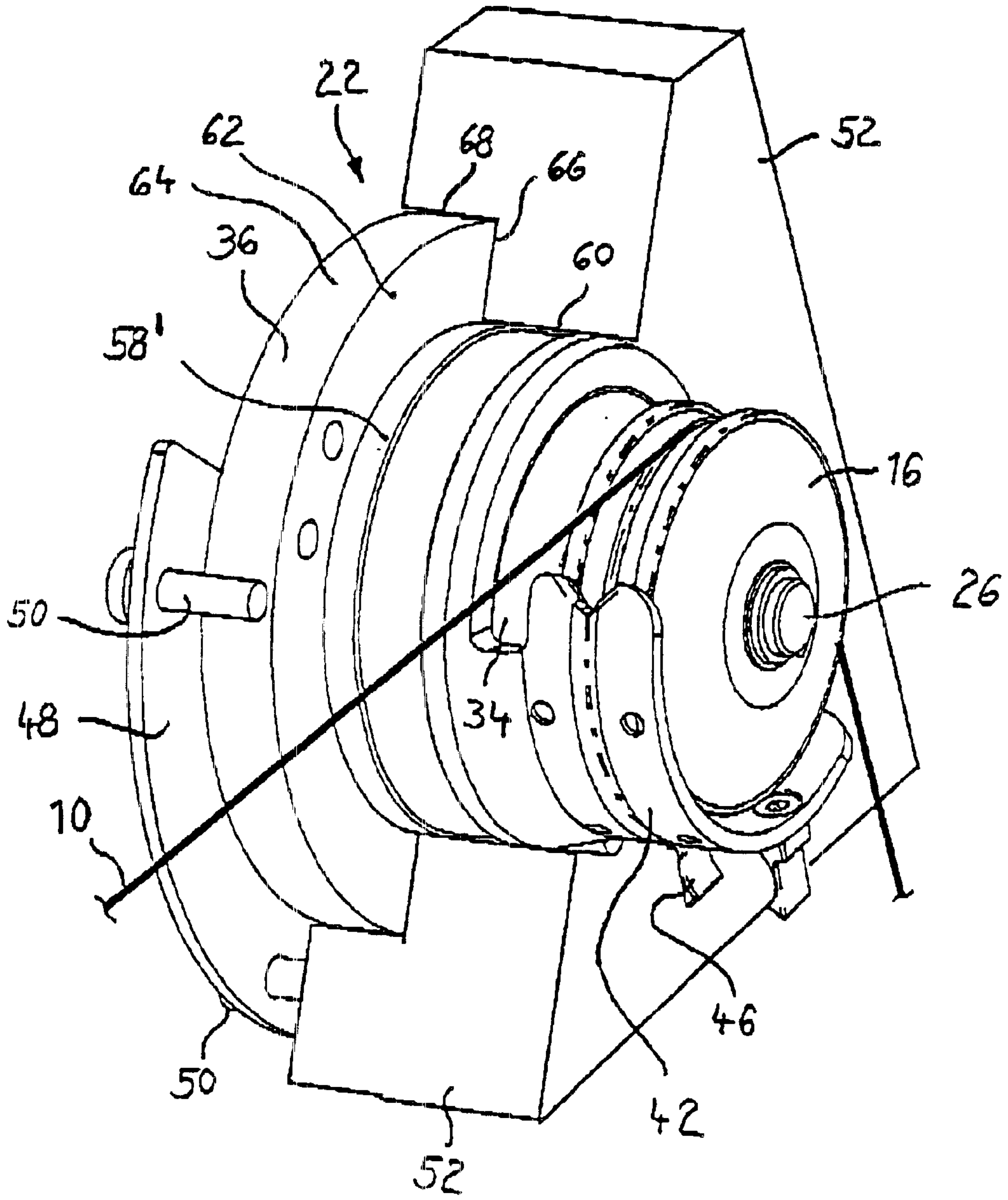
FIG. 5 is a perspective view of the embodiment of FIGS. 2–4 being installed in a machine frame which has a portion cut away for purposes of illustration.

Details of the assembly composed of the deflection roller 16 and the lifting mechanism 22 are shown in FIGS. 2–5. In FIG. 2, the lifting mechanism is illustrated in the first or retracted position. In FIG. 3, the lifting mechanism is in the second or actuated position. FIG. 4 shows an exploded view of the various parts of the assembly with the deflection roller 16 and the lifting mechanism, while FIG. 5 shows the assembly installed in a frame in a perspective illustration.

According to FIG. 2, the deflection roller 16 has a guide or rail groove 24 that accepts the traction cable 10. The deflection roller 16 is rotatably mounted on a shaft 26, which is best illustrated in FIG. 4. An insert 28 that has a handle 30 with a grasping region is rigidly held on this shaft 26. The insert 28 carries an interlocking flange 32 which has a semicircular shape that is best illustrated in FIGS. 3 and 4.

As shown in FIG. 4, the insert 28 has an annular section 34 that is introducible into a rotary flange 36. The rotary flange 36 has dog pins, such as 38, that engage into dog holes 40 for a twist-resistance seating of the insert 28. The rotary flange 36 carries an approximately semi-cylindrically-shaped lifting ring segment 42 whose inside diameter is slightly greater than the outside diameter of the deflection roller 16. The lifting ring 42 has a rail or guide groove 44 for the acceptance of the traction cable 10. Mounting elements 46 serve the purpose of dependable introduction of the cable and, thus, as assembly aids.

FIGS. 2, 3, 4 and 5 also show the arrangement of an interlocking member plate or diaphragm 48 in the form of a semicircular ring. This interlocking diaphragm 48 is connected with screws 50 to a rigid frame 52 of a machine, which is shown in greater detail in FIG. 5.

The function of the assembly comprising the deflection roller 16 and the lifting mechanism 22 is explained below with reference to FIGS. 2–5. FIG. 4 shows the condition wherein the deflection roller 16 together with the insert 28 are not in engagement with the rotary flange 36. In this condition, the deflection roller 16 or its bearing or the entire unit comprising the components 16 and 28 can be replaced. For inserting the insert 28 with the deflection roller 16, the insert 28, in the illustrated position, is guided in the direction of the dot-dashed lines so that the interlocking flange 32 can be introduced above the interlocking member 48 and the annular section 34 can be guided in an inner ring 54 of the rotary flange 36, so that the dog pins 38 proceed into the dog holes 40. In this way, the rotary flange 36 is torsionally connected to the insert 28. The interlocking flange 32 lies against a surface 56 of the rotary flange 36, so that the interlocking flange 32 can be pivoted or rotated into the free interspace behind the interlocking member or plate 48.

With the combination of the rotary flange 36 and the flange 32 being rotated to the first position, as shown in FIG. 2, the lifting mechanism 22 will be rotated into the first or retracted position. The traction cable 10 is accepted by the rail groove 24 of the deflection roller 16. The interlocking flange 32, as mentioned, is situated behind the interlocking member 48, so that the insert 28 cannot be moved out in an axial direction. The interlocking flange 32 and the interlocking plate 48 function as an axial interlocking mechanism and are actually locked in the illustrated position.

In order to proceed into the second position for the lifting mechanism 22 shown in FIG. 3, the handle 30 is turned in the direction of the arrow P2 through 180°, which results in the insert 28 together with the rotary flange 36 being rotated or pivoted through 180°. After the implementation of this motion, it can be seen in FIG. 3 that a clearance 58 is present between the interlocking member 48 and the interlocking flange 32, so that the insert 28 can be removed in the direction of the arrow P3. The axial interlocking mechanism, which is formed by the interlocking flange 32 and the interlocking plate 48, is axially unlocked in this position, so that the insert 28 can be axially removed in the direction P3. As a result of the swivel motion or rotary motion in the direction of the arrow P2, the lifting ring 42 is likewise moved in the direction of the arrow P2, as a result whereof, its rail groove 44 accepts the traction cable 10. Given this swivel motion, the mounting elements 46 serve as guide aids for the traction cable 10. In the condition of the second position of the lifting mechanism 22, which is shown in FIG. 3, the traction cable 10 is held at a distance from the deflection roller 16 so that the deflection roller 16 together with the insert 28 can be moved out in an axial direction P3.

FIG. 5 illustrates the assembly comprising the deflection roller 16 and the lifting mechanism 22 in the first or retracted position. It can be seen that the annular section 58' is received in a ring bearing 60 of the rigid frame 52 of the machine, which is shown in FIG. 5 with a portion cut away for purposes of illustration. In addition, an end face 62 as well as an annular surface 64 of the rotary flange 36 lie against bearing surfaces 66 and 68 formed by a recess in the frame 52. It can be seen with reference to FIG. 5 that the deflection roller 16 is arranged in a region within the machine that is difficult to access. In contrast thereto, the insert 28 accepted in the rotary flange 36 is easily accessible proceeding from the left in FIG. 5, so that the insert 28 together with the deflection roller 16 can be removed in an axial direction when the lifting mechanism 22 is in the second position shown in FIG. 3.

Figure 6:
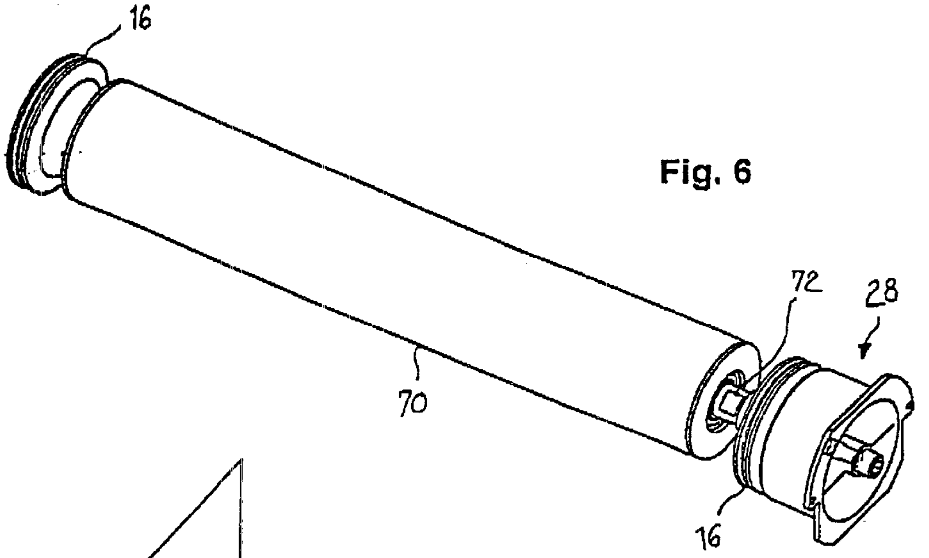
FIG. 6 is a perspective view of a second exemplary embodiment of a guide drum with two deflection rollers.

An inventive exemplary embodiment of the assembly, which comprises a guide drum 70 having deflection rollers 16 arranged at both sides or ends as typically occurs in a web-processing machine, for example in a printing machine, is illustrated in FIGS. 6–12. Identical parts continue to be identically referenced. The guide drum 70 serves the purpose of guiding a web material. The deflection rollers 16 for guiding a traction mechanism, for example a traction cable, are provided on a shared hollow shaft 72 on both ends of the guide drum 70. This traction mechanism serves the purpose of largely automatically pulling a leading section of the web material through the entire machine at the beginning of the web transport. The deflection roller 16 shown at the right in FIG. 6 is connected to the insert 28, which was described in the preceding Figures, and is merely shown schematically in FIG. 6 and in the following Figures. As set forth later, the entire assembly having the two deflection rollers 16, the guide drum 70 and the hollow shaft 72 can be removed by removing the insert 28.

Figure 7:
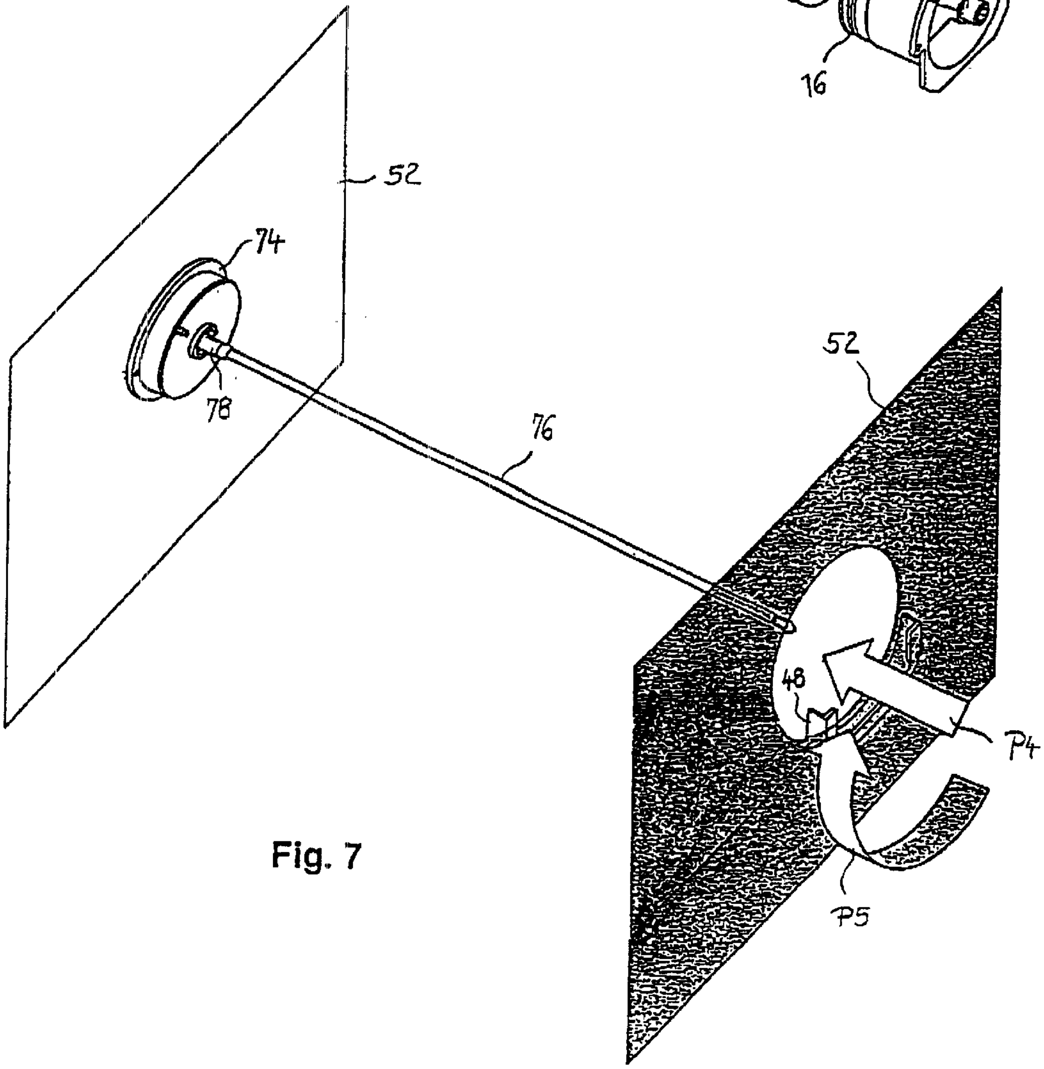
FIG. 7 is a perspective view of portions of a machine frame for receiving the guide drum and two deflection rollers of FIG. 6.

The structure with frame-fixed components, i.e., components that are rigidly connected to the frame part 52, are shown in FIG. 7. These components include a flange 74 that carries an acceptance mandrel 76. This acceptance mandrel 76 has a conical surface 78 in the region of the flange 74 that serves the purpose of fine-centering once receiving the hollow shaft 72, which is telescopically inserted over the mandrel 76. The acceptance mandrel 76 serves as an assembly aid by telescopically receiving the hollow shaft 72 of FIG. 6 when it is pushed from the right side of the frame 52 over the acceptance mandrel in the direction of the arrow P4. The right-hand housing frame also carries an interlocking member 48. The arrow P5 indicates the swivel or rotational movement by which the insert 28 can be swivelled or rotated in order to proceed into the interlocked position wherein an axial locking between the interlocking flange 32 of the rotary flange 36 and the interlocking diaphragm or member 48 occurs.

Figure 8:
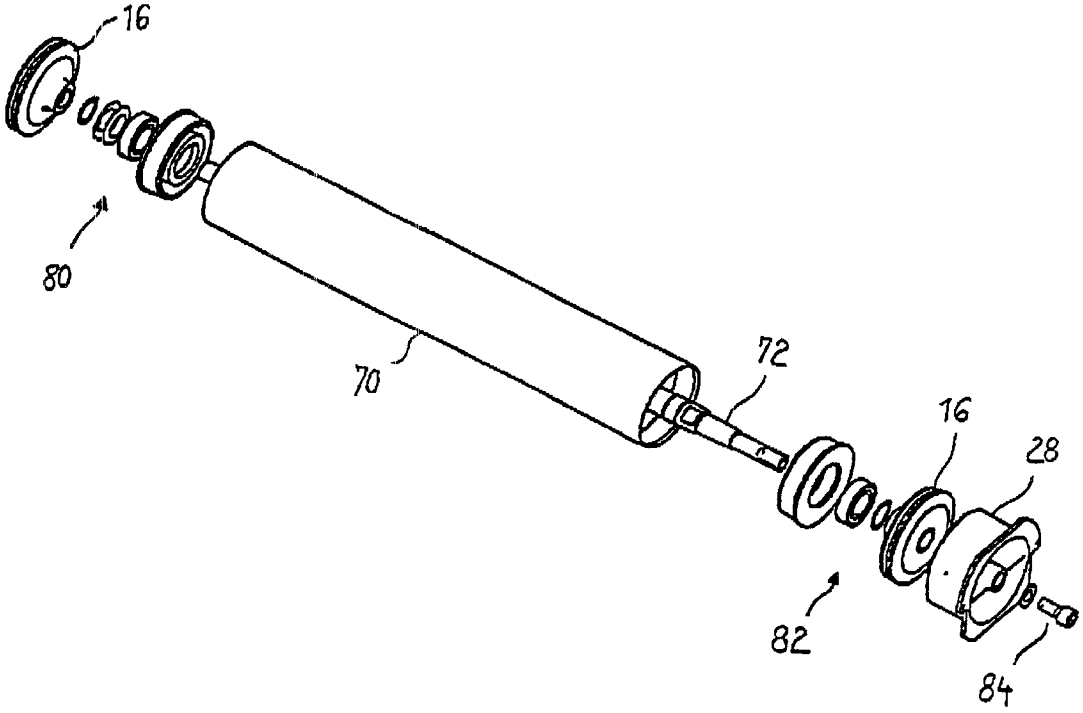
FIG. 8 is a perspective view of the guide drum of FIG. 6 with portions disassembled.

An exploded view of the structure of the assembly of FIG. 6 is shown in FIG. 8. To be seen are the left-hand deflection roller 16 for the traction cable 10, the bearing elements 80 that hold the drum-shaped guide drum 70 and bear on the hollow shaft 72, the bearing elements 82 for the right-hand bearing of the guide drum 70, the right-hand deflection roller 16 for the corresponding traction cable 10, the insert 28 and the bearing screws 84 which connect to the end section of the hollow shaft 72.

Figure 9:
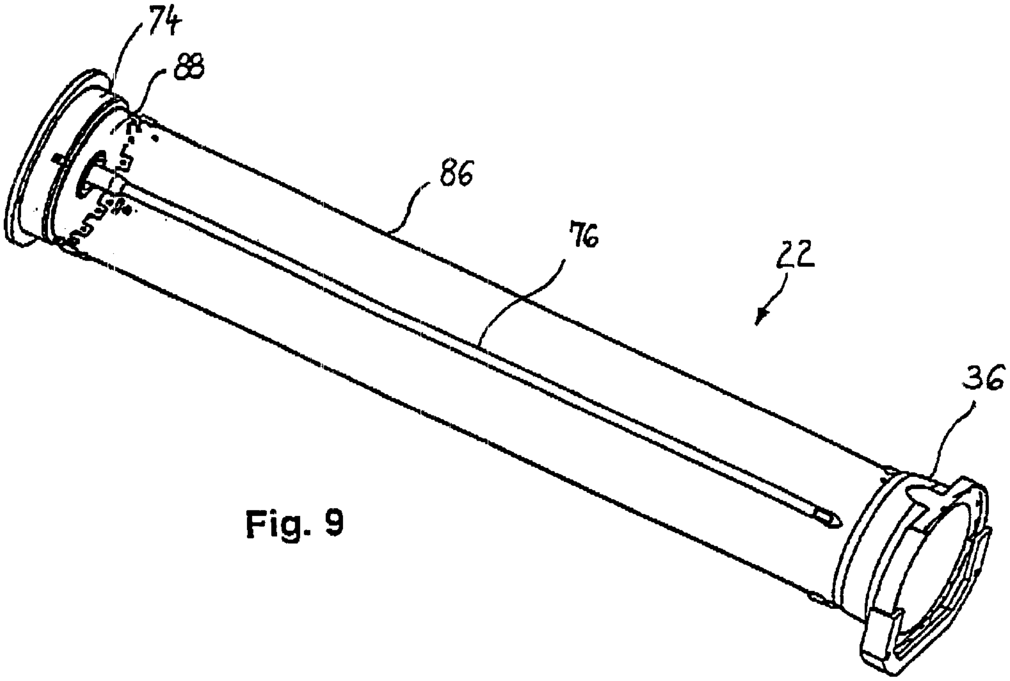
FIG. 9 is a perspective view of a lifting element in a first, retracted position.

A lifting mechanism, generally indicated at 22 overall in FIGS. 6–12, is shown in FIG. 9. The lifting mechanism 22 comprises a lifting element 86 that has the form of a semi-cylindrical cladding or jacket and is connected to the rotary flange 36 at the right-hand side of FIG. 9. The rotary flange 36 is constructed in the fashion of the rotary flange 36 of FIGS. 2–5. A supporting element 88, which is connected to the semi-cylindrically cladding-shaped lifting element 86 is seated on the flange 74 on the left-hand side of FIG. 9.

Figure 10:
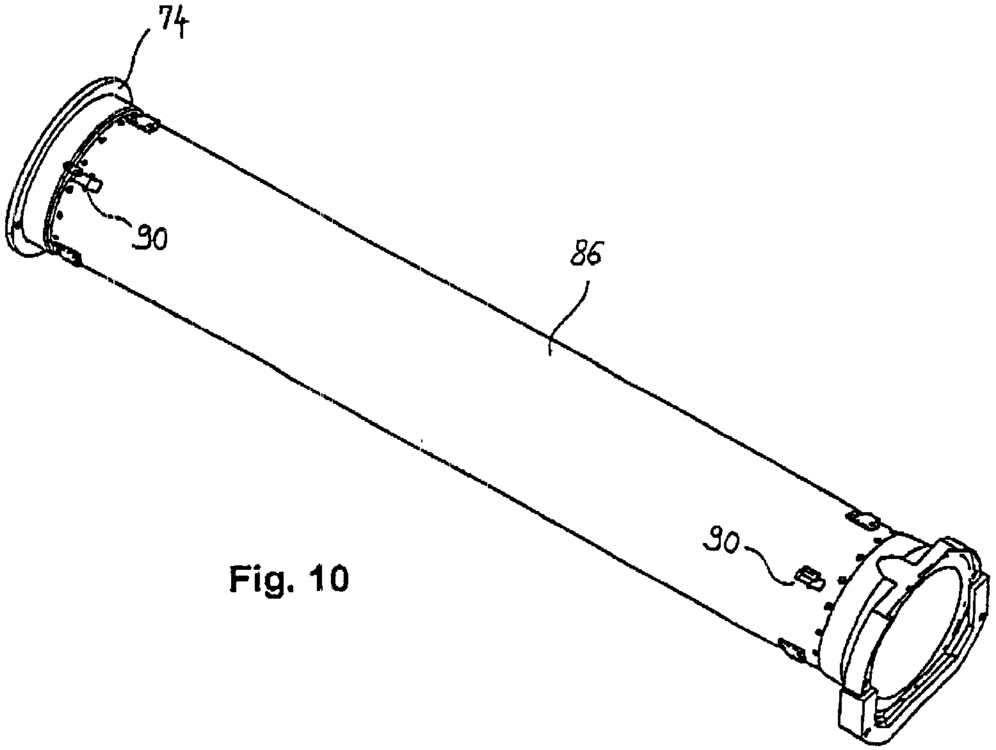
FIG. 10 is a perspective view of the lifting element of FIG. 9 in the second, actuated position.

As illustrated in FIG. 10, the arrangement of FIG. 9 is viewed onto the semi-cylindrically cladding-shaped lifting element in the second position. The lifting element 86 has acceptance elements 90 at the two ends for the acceptance of the traction cable 10 when the element is in the second position, wherein the lifting element 86 holds the traction cable 10 at an elevated position from the deflection rollers 16.

Figure 11:
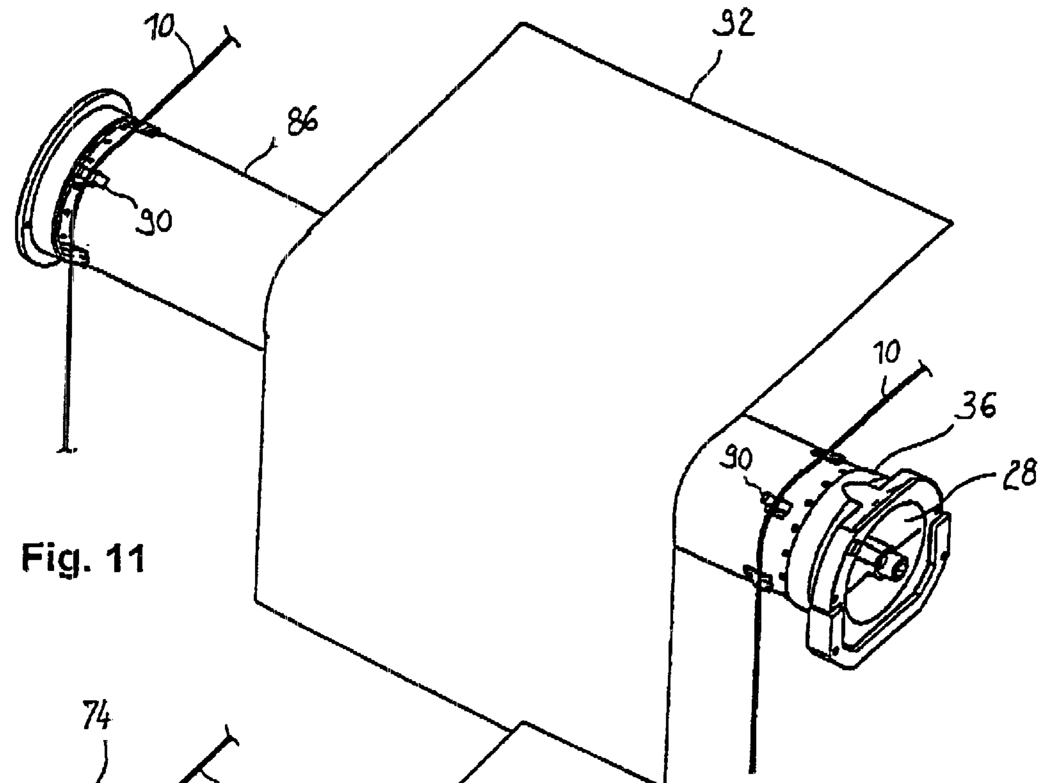
FIG. 11 is a perspective view illustrating the support of the material web and cables by the lifting element of FIGS. 9 and 10 in the second, actuated position.

FIG. 11 shows the arrangement with the lifting element 86 during operation, namely in the second position, wherein the lifting element 86 holds both the traction cables 10 in the acceptance elements 90 at a distance from the deflection rollers 16 and also holds a material web 92 at a radial distance from the guide drum 70. In this condition, the insert 28 can be removed from the rotary flange 36 so that all parts shown in FIG. 8 can be removed in an axial direction. For example, the guide drum 70 and the deflection rollers 16 and their bearings can be completely replaced in this manner. Neither the traction cable 10 nor the material web 92 needs to be removed during this replacement. The entire replacement can proceed from the right-hand side of the housing in FIG. 11. Separate access to the left-hand housing side in FIG. 11 is not required.

Figure 12:
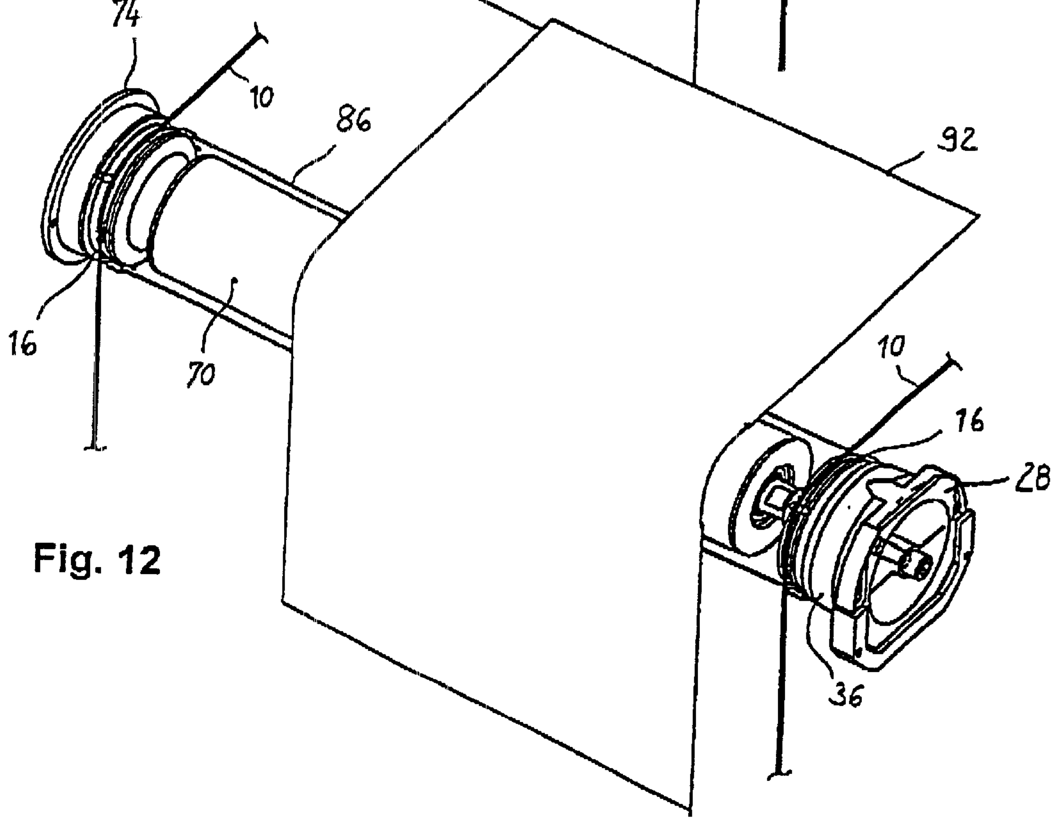
FIG. 12 is a perspective view of the lifting element of FIGS. 9 and 10 in the first, retracted position.

FIG. 12 shows the operating condition in the first or retracted position for the lifting mechanism. The lifting element 86 is then pivoted or rotated into a position wherein the material web 92 is now engaged on the guide drum 70 and the traction cables 10 also run on the deflection rollers 16. The lifting element 86 does not impede the rolling of the material web 92 on the roller or drum 70 or the traction cables 10 on the rollers 16.

The described exemplary embodiments can be modified within the framework of the invention. For example, the lifting element 86 can have a form deviating from a semi-cylindrical cladding form and can describe an angle greater than or less than 180° as seen in the circumferential direction. When only the traction mechanisms are to be lifted up, semi-annular lifting elements in the fashion of lifting elements 42 in FIGS. 2–5 can be employed in the environment of the deflection roller 16. The lifting element removed from the rotary flange can then be moved with the assistance of a torque that is transmitted via the hollow shaft 72. In order for them to be able to remove the shaft 72, such a semi-annular lifting element should be mechanically connected to the hollow shaft 72 in a force-transmitting fashion via a releasable coupling, for example a claw coupling.

The guide elements 16 for the cable in the illustrated exemplary embodiment are implemented as rollers and the guide element for the web is a drum 70. However, it is also conceivable that these guide elements are torsionally arranged, and this is particularly true for guide elements for guiding web materials.

Although various minor modifications may be suggested by those versed in the art, it should be understood that we wish to embody within the scope of the patent granted hereon all such modifications as reasonably and properly come within the scope of our contribution to the art.

We claim:

1. An apparatus for guidance of elongated material, which is selected from material webs and traction mechanisms, in a web-processing machine, said apparatus including at least one guide element for guiding elongated material, a rotatable lifting mechanism for each of said guide elements, said lifting mechanism being pivoted between a first position on the guide element retracted from a region of the guide element engaging the elongated material and a second position wherein the lifting mechanism holds the elongated material at a spaced distance from the guide element, the at least one guide element being a guide drum for guiding a web material, said guide drum being connected to an insert and being removable in an axial direction together with the insert when the lifting mechanism is moved into the second position.

2. An apparatus according to claim 1, wherein the lifting mechanism is arranged along a circumference of the guide element concentrically to a center axis thereof and, as seen in a circumferential direction, the first position and the second position are offset relative to one another by an angle that is greater than a wrap angle of the elongated material.

3. An apparatus according to claim 1, wherein the guide element is selected from a guide drum and a deflection roller around which the elongated material is deflected.

4. An apparatus according to claim 1, wherein the elongated material is fashioned as a traction mechanism.

5. An apparatus according to claim 4, wherein the traction mechanism is a traction cable.

6. An apparatus according to claim 4, wherein the lifting mechanism contains a semi-cylindrical lifting ring segment for holding the traction mechanism at a distance from the guide element while in the second position.

7. An apparatus according to claim 6, wherein the lifting ring segment is connected to a rotary flange that is rotatably accepted in a frame part and wherein the guide element is connected to an insert that is torsionally accepted within the rotary flange.

8. An apparatus according to claim 7, wherein an axial interlock mechanism is provided that axially locks the insert in a first position and releases it in an axial direction when rotated to a second position.

9. An apparatus according to claim 8, wherein the interlock mechanism comprises an interlock flange on the insert and an interlocking member stationarily arranged on a frame part.

10. An apparatus according to claim 1, wherein the lifting mechanism contains a lifting element in the form of a partial cylindrical member whose axial length is dimensioned so that it holds a web material at a distance from a guide element while in the second position.

11. An apparatus according to claim 1, wherein the lifting mechanism contains a lifting element in the form of a partial cylindrical member that holds traction elements arranged on both sides of the web material at a distance from the guide element while the lifting element is in the second position.

12. An apparatus according to claim 1, wherein the guide drum is assembled on a hollow shaft and has a deflection roller at each end.

13. An apparatus according to claim 1, wherein the lifting mechanism contains a semi-cylindrical lifting ring segment that holds a traction mechanism at a distance from the guide element when the lifting mechanism is in the second position.

14. An apparatus according to claim 13, wherein the lifting ring segment is connected to a rotary flange that is rotatably accepted in a frame part, the guide element is connected to an insert that is torsionally accepted within the rotary flange.

15. An apparatus according to claim 14, wherein an axially interlocking mechanism is provided that axially interlocks the insert in a first position and releases it in an axial direction when in the second position.

16. An apparatus according to claim 15, wherein the interlock mechanism comprises an interlocking flange at the insert and an interlocking member stationarily arranged on a frame part.

17. A method for guiding an elongated material, which is selected from a material web and a traction mechanism, in a web-processing machine, said machine having at least one guide element for guiding the elongated material, a pivotable lifting mechanism allocated to each guide element, said lifting mechanism being pivotable from a first position on the guide element outside of the region wherein the elongated material engages the guide element into a second position which holds the elongated material at a distance from the guide element, said method comprising rotating the lifting mechanism from the first position to the second position to lift the elongated material off of the guide element and then axially removing the guide element from said machine.

18. A method according to claim 17, wherein the lifting mechanism is arranged along the circumference of the guide element concentrically to a center axis, said first position being offset from the second position by a first angle greater than a wrap angle of the elongated material on the guide element, said method including preparing the guide element for removal from the frame by pivoting the lifting mechanism from the first position through the first angle to the second position.

19. A system for processing elongated material selected from printing and copying, said system including a plurality of guide elements for guiding the elongated material through various changes of path, each guide element being mounted in the system for axial removal from the system, each guide element having a lifting mechanism mounted on the guide element and movable between a first position retracted from the region where the guide element engages the elongated material to a second position lifting the elongated material off of the guide element so that the guide element can be axially removed from the system without disturbing the elongated material.

20. An apparatus for guidance of elongated material, which is selected from material webs and traction mechanisms, in a web-processing machine, said apparatus including at least one guide element for guiding elongated material, a rotatable lifting mechanism for each of said guide elements, said lifting mechanism being pivoted between a first position on the guide element retracted from a region of the guide element engaging the elongated material and a second position wherein the lifting mechanism holds the elongated material at a spaced distance from the guide element, the lifting mechanism containing a semi-cylindrical lifting ring segment that holds a traction mechanism at a distance from the guide element when the lifting mechanism is in the second position, the lifting ring segment being connected to a rotary flange that is rotatably accepted in a frame part, the guide element being connected to an insert that is torsionally accepted within the rotary flange, and an axially interlocking mechanism being provided that axially interlocks the insert in a first position and releases the insert in an axial direction when in the second position.

* * * * *